(12) United States Patent
Eng et al.

(10) Patent No.: US 11,372,781 B2
(45) Date of Patent: Jun. 28, 2022

(54) PROGRAMMABLE CHIP ENABLE FOR SWITCHING AND SELECTING FUNCTIONS TO REDUCE DATA LOADING AND INCREASE THROUGHPUT

(71) Applicant: PetaIO Inc., Santa Clara, CA (US)

(72) Inventors: Ivan Eng, Santa Clara, CA (US); Xinning Song, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 122 days.

(21) Appl. No.: 17/003,611

(22) Filed: Aug. 26, 2020

(65) Prior Publication Data

US 2022/0066953 A1 Mar. 3, 2022

(51) Int. Cl.
*G06F 13/16* (2006.01)

(52) U.S. Cl.
CPC .......... *G06F 13/16* (2013.01); *G06F 2213/40* (2013.01)

(58) Field of Classification Search
CPC .. G06F 13/16; G06F 2213/40; G06F 13/4022; G06F 13/4027
See application file for complete search history.

(56) References Cited

U.S. PATENT DOCUMENTS

| | | | | |
|---|---|---|---|---|
| 6,131,139 A * | 10/2000 | Kikuchi | ................ | G06F 13/161 |
| | | | | 365/189.04 |
| 7,492,660 B2 * | 2/2009 | Harari | ................ | G11C 11/5621 |
| | | | | 365/185.11 |
| 8,074,040 B2 * | 12/2011 | Chen | ...................... | G11C 16/10 |
| | | | | 365/194 |
| 8,166,228 B2 * | 4/2012 | Cheng | ................ | G06F 13/4239 |
| | | | | 711/127 |
| 8,447,917 B2 * | 5/2013 | Chen | .................. | G06F 13/1684 |
| | | | | 711/E12.001 |
| 8,743,610 B2 * | 6/2014 | Kim | ...................... | G06F 3/0655 |
| | | | | 365/185.11 |

* cited by examiner

*Primary Examiner* — Raymond N Phan
(74) *Attorney, Agent, or Firm* — David R. Stevens; Stevens Law Group

(57) ABSTRACT

A memory module includes arrays of memory devices each having a data bus coupled to the data bus of a host memory channel by means of a switching tree. The switching tree is a tree of multiplexers that are controlled to couple the data lines of a single array to the data bus. In some embodiments, a first portion of the chip enable (CE) lines of a memory module are used to enable arrays of memory devices and a second portion are used to control the switching tree. The first portion may control a switching tree coupling the first portion to the enable inputs of the arrays.

20 Claims, 4 Drawing Sheets

PROGRAMMABLE CHIP ENABLE FOR SWITCHING AND SELECTING FUNCTIONS TO REDUCE DATA LOADING AND INCREASE THROUGHPUT

BACKGROUND

Field of the Invention

This invention relates to systems and methods for implementing control circuitry for a nonvolatile memory device.

Background of the Invention

Many memories include multiple arrays of memory devices connected in parallel to the same host interface. The arrays are independently addressable by asserting chip enable (CE) signals corresponding to each array. To support high capacities storage application, more memory devices are connected in parallel.

It would be an improvement in the art to improve the function of memory device including multiple arrays of memory chips.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
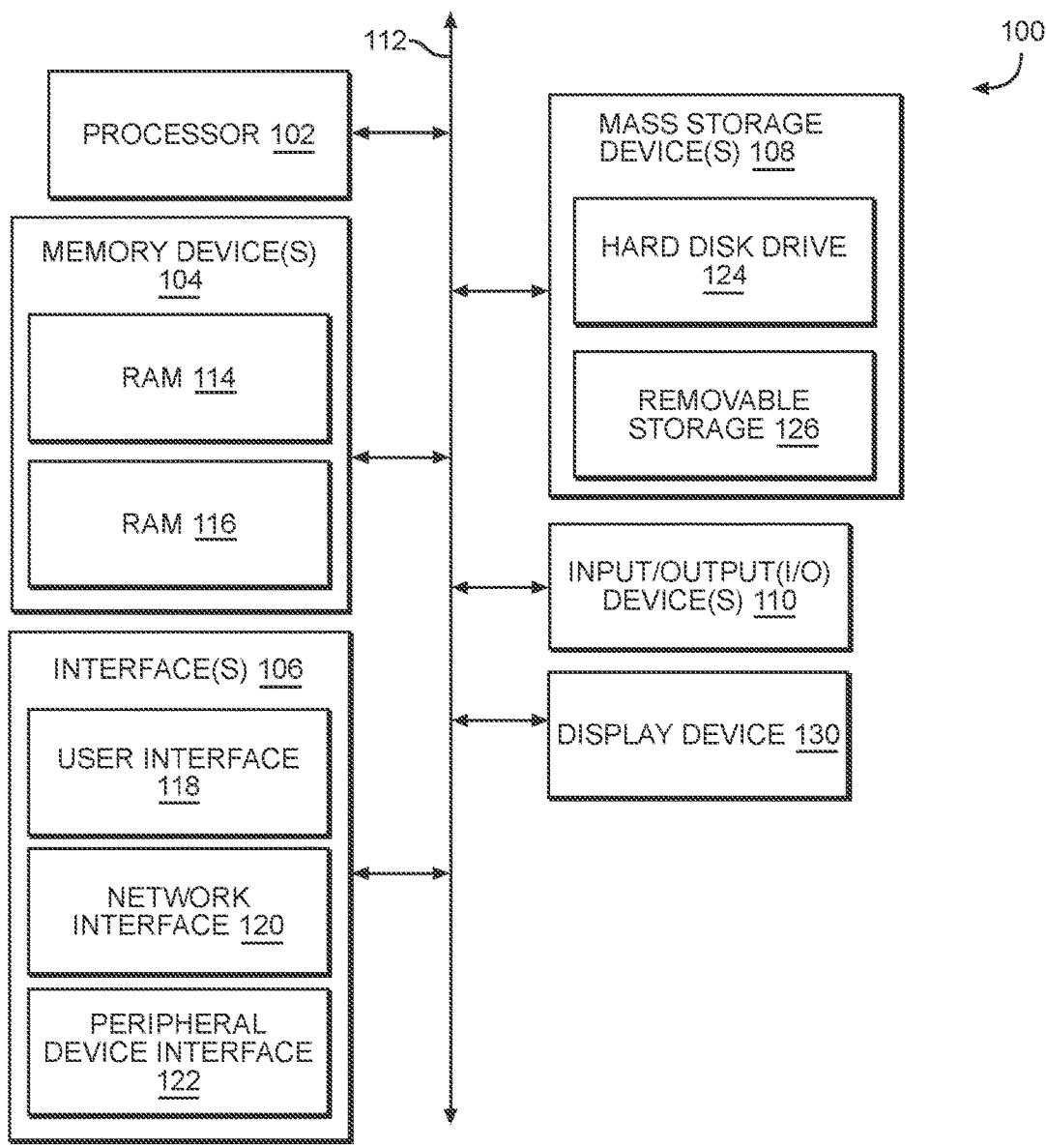
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
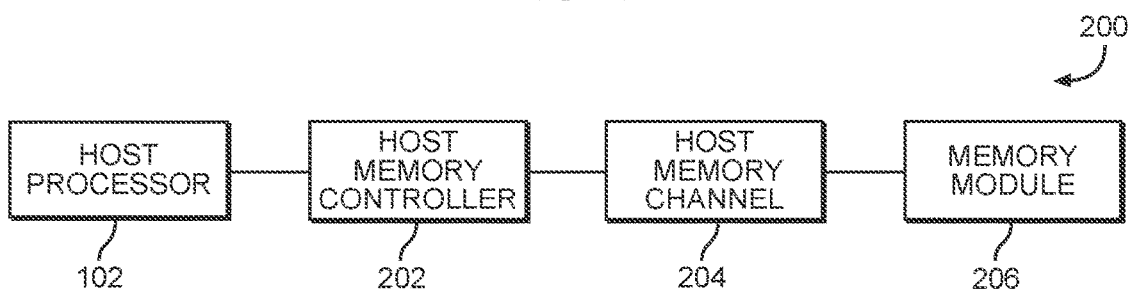
FIG. 2 is a schematic block diagram of components of a memory system in accordance with the prior art.

Referring to FIG. 2 a memory 104 may have the architecture 200 shown in FIG. 2. In particular, a host processor 102 may connect to a host memory controller 202 (hereinafter "host controller 202"), such as by way of a bus 112 or other component of the computing device 100. The host memory controller 202 may connect by way of a host memory channel 204 to a memory module 206. The host memory controller 202 and host memory channel 204 may be implemented using any approach known in the art for such devices. The host memory controller 202 may be further modified to operate in conjunction with the memory modules disclosed below.

Figure 3:
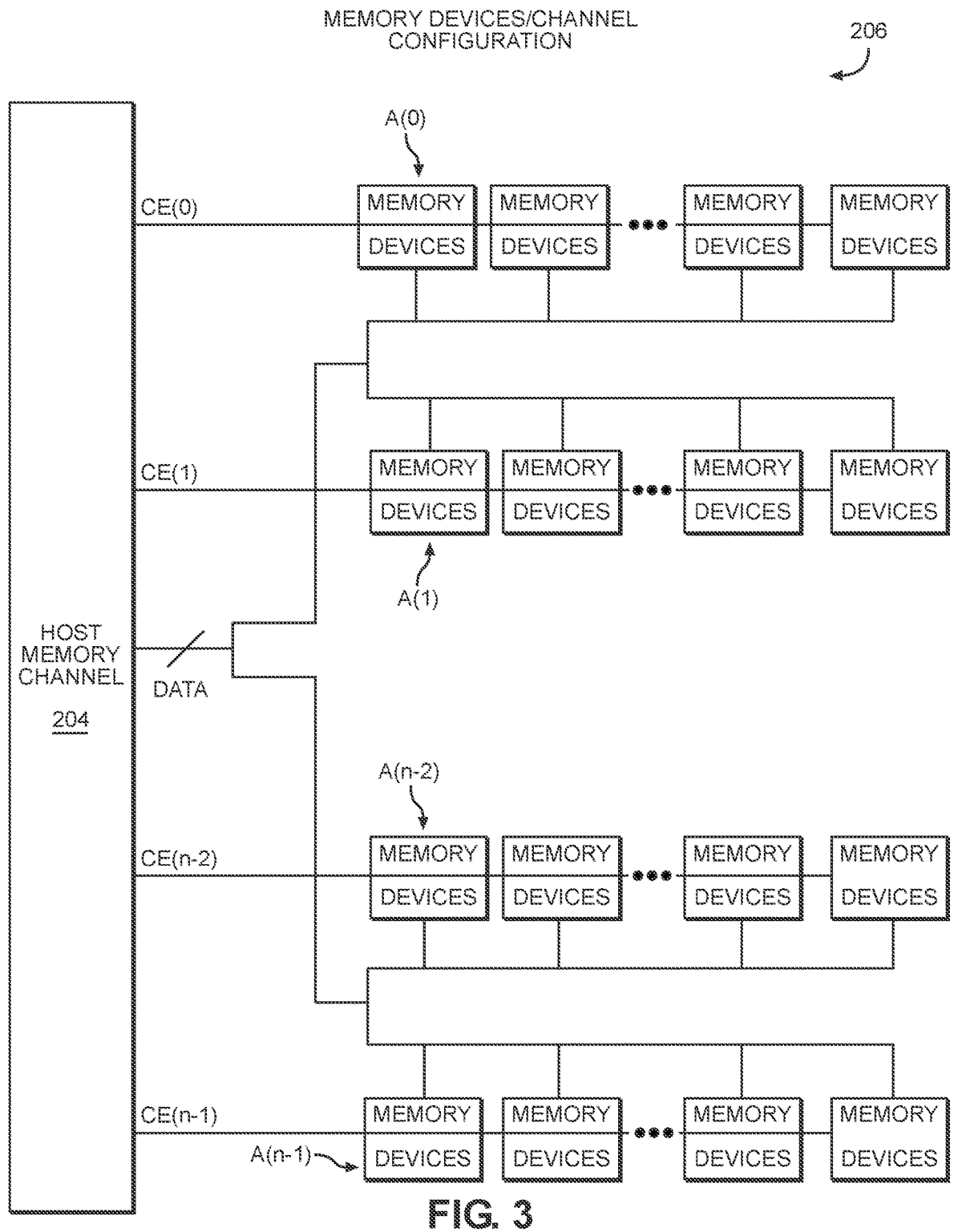
FIG. 3 is a schematic block diagram of a memory in accordance with the prior art.

Referring to FIG. 3, in a conventional memory, the host memory channel 204 uses a data bus ("DATA") to read and write data to a particular array A(0:n−1) of memory devices in the memory module 206. In particular, the host memory channel 204 may assert a particular chip enable (CE) line CE(0) to CE(n−1) corresponding to each array A(0:n−1). Note that the chip enable lines may also be referred to as chip select (CS) lines in some applications. Accordingly, to read from or write to an array A(i), where i is a value between 0 and n−1, the corresponding CE line CE(i) is asserted.

To support high capacity storage application, more arrays of memory devices are connected in parallel. As a consequence, the DATA bus is too heavily loaded to support high data rate operation.

Figure 4:
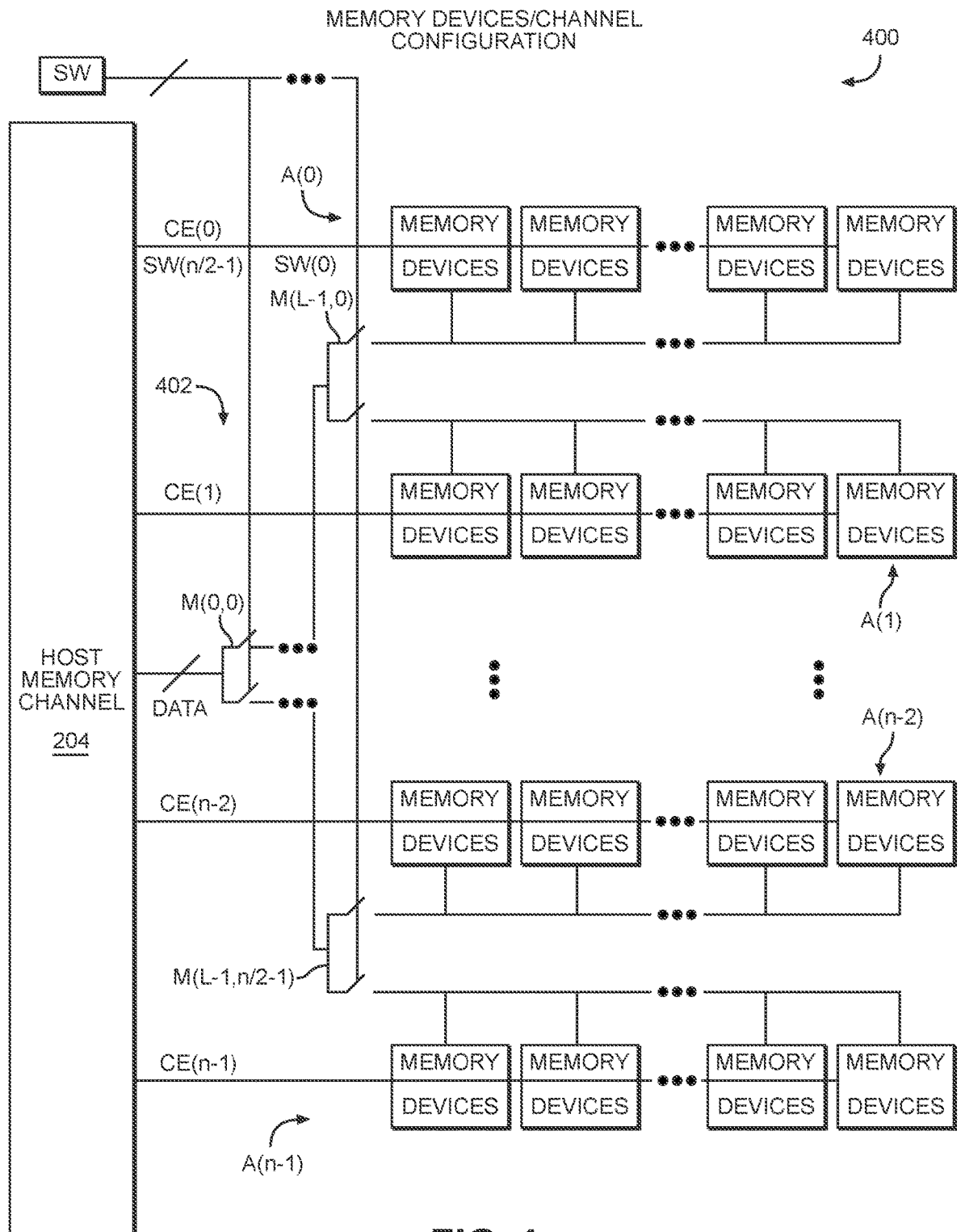
FIG. 4 is a schematic block diagram of a memory in accordance with an embodiment of the present invention.
Figure 5:
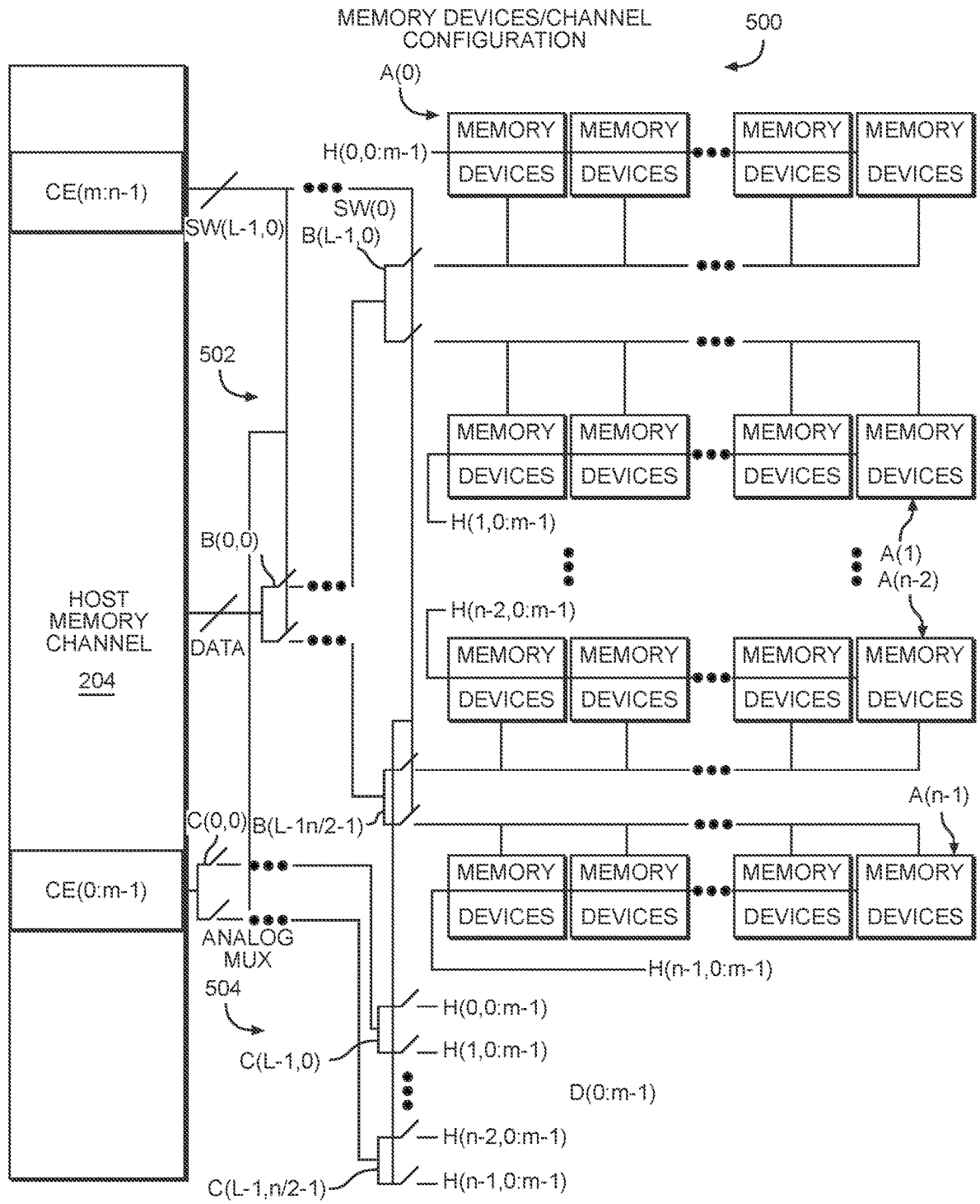
FIG. 5 is a schematic block diagram of another memory in accordance with an embodiment of the present invention.

FIGS. 4 and 5 illustrate alternative approaches in which the CE signals are programmed to support switching function in addition to a chip enable or a chip selection function. By programming a portion of the CE signals to a switching function the need for additional switching pins is reduced. Hence, it reduces the cost of silicon implementation. At the same time, it increases throughout when driving large loads and high capacitances.

Referring specifically to FIG. 4, in some embodiments, a memory module 400 may be coupled to the host memory channel 204. The host memory channel 204 may implement a data bus (DATA) and a chip enable bus (CE(0:n−1)). Each line of DATA and CE(0:n−1) may correspond to a pin that connects to the memory module 400. Accordingly, these pins may be defined by a memory slot for receiving the memory module 400. For example, the memory module 400 may be embodied as a DIMM (dual inline memory module) having pins and dimensions according to any standard DIMM design (e.g. 32 bit DIMM or 64 bit DIMM) and having a number of contacts according to any design known in the art (e.g., from 70 to 288 pins). The host memory channel 204 may be embodied as the corresponding standard DIMM slot having a corresponding number of pins.

In the illustrated embodiment, the host memory channel 204 is supplemented with a number of switching lines SW that may have corresponding pins connecting to corresponding contacts on the memory module 400. The pins of the host channel corresponding to the switching lines SW may be in the same slot implementing the other pins (CE(0:n−1), DATA). The memory module 400 may therefore implement contacts corresponding contacts for contacting these pints. Alternatively, since the SW lines are not part of the standard DIMM architecture, the SW lines of the host channel 204 may connect separately to corresponding contacts on the memory module 400, such as by means of separate wires and connectors.

The memory module 400 is formed of arrays A(0:n−1) of memory devices. Each memory device may be one or more memory chips. As for the embodiment of FIG. 3, each array A(i) of the arrays A(0:n−1) is coupled to a corresponding chip enable line CE(i) of the chip enable lines CE(0:n−1). Data bus D(0:n−1) of each array A(0:n−1) are connected to a switching tree 402. The switching tree 402 is controlling by the switching lines SW and ensures that when data is read from or written to a particular array A(i), only the data bus D(i) connected to that array A(i) are connected to the DATA bus.

In this manner, the capacitance of the lines coupling array A(i) to the DATA bus is reduced. In particular, capacitances of lines and contacts specific to the other arrays will not need to be charged when reading from and writing to array A(i). This decreases latency and reduces the penalty that would normally result from increasing the capacity of the memory module 400.

In the illustrated embodiment, the switching tree 402 is defined by a plurality of multiplexers, such as an array of analog multiplexers. For example, where there are n arrays A(0:n−1), there may be $L=\log_2(n)$ levels in the tree. Each level k of the tree, k=0 being the level connecting to the DATA bus, includes $2^k$ multiplexers. The multiplexers may be denoted M(k, j), j=0 to $2^k-1$, where j identifies a particular multiplexer at level k.

As known in the art, a multiplexer includes an input 0, an input 1, an output, and a select line. When the select line is at a binary 0 voltage, the signal on input 0 is coupled to the output. When the select line is at a binary 1 voltage, the signal on input 1 is coupled to the output. In the illustrated embodiment, each multiplexer M(k, j) is a multi-line multiplexer or represents an array of multiplexers. In particular, each multiplexer M(k, j) controls a number of data lines equal to the number of data lines in the DATA bus. Accordingly, input 0, input 1, and output may each be considered to be bus having a number of lines equal to the number of lines in the DATA bus.

The input 0 and input 1 of a particular multiplexer M(k, j), k!=L−1, are connected to the outputs of multiplexer M(k+1, 2*j) and multiplexer M(k+1, 2*j+1), respectively.

The output of the multiplexer M(0,0) is connected to the DATA bus. For k=L−1, input 0 and input 1 of each multiplexer M(L−1, j) are connected to bus D(2*j) and bus D(2*j+1), respectively.

The select input of each multiplexer M(k, j) is connected to one of the switching lines SW. In the illustrated embodiment, the select input of multiplexers M(k, j) of each level k are connected to the same switching line SW(L−k−1). Accordingly, there are $L=\log_2(n)$ switching lines SW. To read from a particular array A(i) the host controller 202 asserts the corresponding chip enable CE(i) and further asserts those switch lines SW that will couple array A(i) to the DATA bus. For example, for a given level k, the switch line SW (L−k−1) coupled to the select inputs of the multiplexers M(k, j) will be set to Sel=Mod(Int(i/($2^{L-k-1}$)), 2), where Mod( ) is the modulo operator and Int( ) returns the integer part of its argument.

Referring to FIG. 5, the approach of FIG. 4 requires additional switch lines SW, which may be feasible in some scenarios. In other scenarios, adding more pins or control lines may not be feasible. Using the approach of FIG. 5, the CE lines CE(0:n−1) of a conventional host memory channel may be combined with the illustrated circuits and a programmed host controller 202 in order to avoid needing additional control lines.

In the embodiment of FIG. 5, a number m (n>m>=1) of the CE lines CE(0:m−1) are used as chip enable lines and the remainder L=(n−m) CE lines (CE(m:n−1) connect to the select inputs of multiplexers B(k, j) of a switching tree 502.

The CE lines CE(0:m−1) are used as chip enable lines. In this embodiment, a second switching tree 504 is used and includes demultiplexers C(k, j). The second switching tree may have a similar tiered structure as the switching tree 502. Accordingly, the first switching tree 502 couples the data buses D(0:n−1) of the arrays A(0:n−1) to the DATA bus and the switching tree 504 couples the chip enable lines CE(0:m−1) to chip enable inputs H(0:n−1,0:m−1) of the arrays A(0:n−1).

In the illustrated embodiment, the switching tree 502 is defined by a plurality of multiplexers B(k, j), such as an array of analog multiplexers. For example, where there are n arrays A(0:n−1) and CE lines CE(m:n−1) are used for switching, there may be L=n−m levels in the switching tree 502.

Each level k of the tree 502, k=0 being the level connecting to the DATA bus, may include $2^k$ multiplexers. The multiplexers may be denoted B(k, j), j=0 to $2^k-1$, where j identifies a particular multiplexer at level k. In the illustrated embodiment, each multiplexer B(k, j) is a multi-line multiplexer or represents an array of multiplexers. In particular, each multiplexer B(k, j) controls a number of data lines equal to the number of data lines in the DATA bus. Accordingly, input 0, input 1, and output may each be considered to be bus having a number of lines equal to the number of lines in the DATA bus.

The input 0 and input 1 of a particular multiplexer B(k, j), k!=L−1, are connected to the output of multiplexer B(k+1, 2*j) and the output of multiplexer B(k+1, 2*j+1), respectively.

The output of the multiplexer B(0,0) is connected to the DATA bus. For k=L−1, input 0 and input 1 of each multiplexer B(L−1, j) are connected to one or more data buses. In particular, the number L of CE lines used for multiplexing may be programmable or variable. Accordingly, where fewer CE lines are used for switching, the number of inputs for multiplexers at level k=L−1 may be less than the total number of data buses D(0:n−1). Accordingly, multiple data buses D(0:n−1) may connect to the same input 0, 1 of a multiplexer B(L−1, j).

For example, where there are L=n−m CE lines used for switching, there will be $2^L$ multiplexer inputs available at the highest level k=L−1. Accordingly, the number of data buses D(0:n−1) coupled to each multiplexer input will be r=n/$2^L$. For example, for a given multiplexer B(L−1, j), the data buses D(2*j*r) to D(2*j*r+r−1) will be connected to input 0 and data buses D(2*j*r+r) to D(2*j*r+2*r−1) will be connected to input 1.

The switching tree 504 has a similar tiered structure to the switching tree 502. In the illustrated embodiment, the switching tree 504 is defined by a plurality of demultiplexers C(k, j), such as an array of analog demultiplexers. For example, where there are n arrays A(0:n−1) and CE lines CE(m:n−m−1) are used for switching, there may be L=n-m levels in switching tree 504.

As known in the art, a demultiplexer includes an output 0, an output 1, an input, and a select line. When the select line is at a binary 0 voltage, the signal on the input is coupled to output 0. When the select line is at a binary 1 voltage, the signal on the input is coupled to the output 1. In the illustrated embodiment, the input and each output 0, 1 is a bus, such as bus having n−m lines.

Each level k of the tree 504, k=0 being the level connecting to the CE lines CE(0:m−1), may include $2^k$ demultiplexers. The demultiplexers may be denoted C(k, j), j=0 to $2^k-1$, where j identifies a particular multiplexer at level k.

The output 0 and output 1 of a particular demultiplexer C(k, j), k!=L−1, are connected to the input of demultiplexer C(k+1, 2*j) and the input of demultiplexer C(k+1, 2*j+1), respectively. The input of the demultiplexer C(0,0) is connected to the CE lines CE(0:m−1).

The switching tree 504 may be a bus tree such that each demultiplexer C(k, j) controls a bus of m lines. Accordingly, there are two parts to selection of an array A(0:n−1). First, the SW signals select a path through the tree 504. Also, a signal is asserted on one of the CE lines CE(0:m−1) to select an array connected to that path.

For example, as noted above, each input 0, 1 of a multiplexer B(L−1, j) may be connected to multiple arrays A(0:n−1). Each output 0, 1 of a demultiplexer C(L−1, j) may have one line connected to each of those multiple arrays. For example, the CE lines of array A(2*j*r:2*j*r+r−1) may be coupled to output 0 of demultiplexer C(L−1, j) and the CE lines of array A(2*j*i+r:2*j*i+2*r−1) are coupled to output 1 of demultiplexer C(m−1, j). In this example, r arrays connect to each output 0, 1.

In this example, an individual CE line z (z=0 to m−1) in output 0 of demultiplexer C(L−1, j) may be coupled to the CE line of A(2*j*r+z). An individual CE line z (z=0 to m−1) in output 1 of demultiplexer C(L−1, j) may be coupled to the CE line of A(2*j*r+r+z).

In the embodiment of FIG. 5, the host memory controller 202 may be programmed to control the SW signals and the CE signals CE(0:m−1) in order to select a particular array A(0:n−1) to couple to the DATA bus. In particular, each array A(i) may be mapped to a combination of a CE line and pattern of SW lines that will all of enable that array A(i), couple the CE line to that array A(i) through the switching tree 504 and couple the bus D(i) to the DATA bus through the switching tree 502.

For example, to enable and connect an array A(i) the select line of each multiplexer in each level k may set to Sel=Mod(Int(i/($2^{L-k-1}$)), 2). The CE line CE(Mod(i, r)) may also be asserted.

In some embodiments, the number of multiplexer inputs in switching tree 502 and multiplexer outputs in switching tree 504 are equal to the number of arrays A(i:n−1). In such embodiments, each array A(i) may be divided into m groups, the memory devices of each group being coupled to one of them lines in the output of the demultiplexer C(L−1, j) to which it is coupled. For example, each array A(i) may be divided into groups A(i, q), where q is a value from 0 to m. Accordingly, the CE input to an array A(i) may be a bus H(i,q) such that group A(i, q) is coupled to line H(i,q). Each bus H(i,q) is connected to the bus output 0 of demultiplexer C(L−1, Int(i/2)), where i is even. Group bus H(i,q) is coupled to the bus output 1 of demultiplexer C(L−1, Int(i/2)), where i is odd. Accordingly, the signal on line H(i,q) will be coupled to CE(q) when coupled to the CE lines by the switching tree 504.

Upon receiving an operation (read or write) referencing a particular location in the memory module 500, the host memory controller 202 will retrieve a mapping and assert the pattern of switching lines SW and CE lines CE(0:m−1) corresponding to that particular location as part of executing the operation. The manner in which data is actually read or written from the particular location may be according to any approach known in the art for reading data from a memory. In particular, where data is located in a particular group q of array A(i), the host memory controller 202 will assert CE line CE(q) and set the signal on each switch line SW (L−k−1) to Mod(Int(i/($2^{L-k-1}$)), 2).

The embodiment of FIG. 5 enables the capacitance of the lines coupling array A(i) to the DATA bus to be reduced. In particular, capacitances of lines and contacts specific to the other arrays will not need to be charged when reading from and writing to array A(i). This decreases latency and reduces the penalty that would normally result from increasing the capacity of the memory module 500. The host memory controller 202 may be programmed to use a particular number of CE lines for switching in order to connect a single array A(i) to the DATA bus. This enables a conventional DIMM slot to be used without requiring additional switching lines or other modification of hardware.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or nonvolatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A memory module comprising:
   a DATA bus;
   a CE (chip enable) bus;
   one or more SW (switch) inputs;
   a plurality of memory device arrays, each CE line of the CE bus input being coupled to one array of the plurality of memory device arrays effective to enable the one array in response to asserting of the each CE line; and
   a switching tree coupling the DATA bus to data lines of the plurality of memory device arrays, the switching tree being coupled to the one or more SW inputs such that the switching tree connects the data lines of one and only one array of the plurality of arrays to the DATA bus, the one and only one array being determined according to signals on the one or more SW inputs.

2. The memory module of claim 1, wherein the switching tree is a tree of multiplexers.

3. The memory module of claim 1, wherein each array of the plurality of memory device arrays includes a plurality of memory chips.

4. The memory module of claim 1, wherein the DATA bus and the CE bus are connected to contacts arranged according to a dual in line memory module (DIMM) standard.

5. The memory module of claim 1, wherein the CE bus and the SW inputs are separate from one another.

6. The memory module of claim 2, wherein the switching tree includes $\text{Log}_2(n)$ levels, where n is a number of the plurality of memory device arrays.

7. The memory module of claim 2, wherein the multiplexers are analog multiplexers.

8. A memory module comprising:
a DATA bus;
a CE (chip enable) bus;
a plurality of memory device arrays each array having a plurality of data lines for transferring data with the plurality of memory devices and an enable input for permitting access of the each array; and
a first switching tree coupling the DATA bus to data lines of the plurality of memory device arrays, the switching tree being coupled to first lines of the CE bus such that the switching tree defines a path through the switching tree to the DATA bus according to signals on the first lines the path coupling data lines of only a portion of the plurality of memory device arrays that is less than all of the plurality of memory device arrays to the DATA bus;
wherein second lines of the CE bus are coupled to the enable inputs of the plurality of memory devices.

9. The memory module of claim 8, further comprising a second switching tree coupling the second lines of the CE bus to the enable inputs of the plurality of memory device arrays.

10. The memory module of claim 8, wherein the first switching tree is a tree of multiplexers.

11. The memory module of claim 8, wherein the DATA bus and the CE bus are connected to contacts arranged according to a dual in line memory module (DIMM) standard.

12. The memory module of claim 9, wherein the first lines are coupled to the second switching tree to control the second switching tree.

13. The memory module of claim 10, wherein the first switching tree includes $\text{Log}_2(n)$ levels, where n is a number of the plurality of memory device arrays.

14. The memory module of claim 10, wherein the multiplexers are analog multiplexers.

15. The memory module of claim 12, wherein the second switching tree is configured such that the second lines of the CE bus are coupled only to the enable inputs of the portion of the plurality of memory device arrays according to the signals on the first lines.

16. An apparatus comprising:
a data bus;
a chip enable (CE) bus;
a host memory controller programmed to operate in a first mode with respect to a first array of a plurality of memory device arrays of a first memory module;
wherein the host memory controller is programmed to operate in the first mode by:
asserting a first signal pattern on first lines of the CE bus effective to configure the first memory module to couple data lines of only a subset of the plurality of memory device arrays to the data bus; and
asserting a second line not included in the first lines of the CE bus to enable an array of the subset of the plurality of memory device arrays.

17. The apparatus of claim 16, wherein the host memory controller is further programmed to operate in a second mode in which a second array of a plurality of memory device arrays of a second memory module connected to the data bus and CE bus is selected by asserting a signal on a line of the CE bus corresponding to the second array and wherein data transfer with the second array is performed over the data bus without altering a path connecting the plurality of memory device arrays of the second memory module to the data bus.

18. The apparatus of claim 4, wherein multiple lines of the CE bus are not included in the first lines.

19. The apparatus of claim 17, wherein the DATA bus and the CE bus are connected to pins of a socket according to a dual in line memory module (DENIM) standard.

20. The apparatus of claim 17, wherein the host memory controller is programmed to assert the first signal pattern on first lines of the CE bus effective to define a path through a switching tree comprising a plurality of multiplexers.

* * * * *